(12) United States Patent
Gayl

(10) Patent No.: US 10,127,493 B2
(45) Date of Patent: Nov. 13, 2018

(54) LOGICAL ENTANGLEMENT DEVICE FOR GOVERNING AI-HUMAN INTERACTION

(71) Applicant: Franz Gayl, Burke, VA (US)

(72) Inventor: Franz Gayl, Burke, VA (US)

(*) Notice: Subject to any disclaimer, the term of this patent is extended or adjusted under 35 U.S.C. 154(b) by 727 days.

(21) Appl. No.: 14/713,562

(22) Filed: May 15, 2015

(65) Prior Publication Data

US 2016/0224884 A1 Aug. 4, 2016

Related U.S. Application Data

(60) Provisional application No. 62/111,360, filed on Feb. 3, 2015.

(51) Int. Cl.
*G06N 99/00* (2010.01)
*G06N 3/04* (2006.01)
*G06N 3/00* (2006.01)
*G06N 5/04* (2006.01)

(52) U.S. Cl.
CPC .......... *G06N 3/04* (2013.01); *G06N 3/002* (2013.01); *G06N 5/04* (2013.01); *G06N 99/00* (2013.01)

(58) Field of Classification Search
CPC ..................................................... G06N 99/00
USPC ..................................................... 706/27, 45
See application file for complete search history.

(56) References Cited

U.S. PATENT DOCUMENTS 9,161,692 B2 * 10/2015 Bowers ............... A61B 5/0006

* cited by examiner

*Primary Examiner* — Wilbert L Starks
(74) *Attorney, Agent, or Firm* — Maier & Maier, PLLC

(57) ABSTRACT

A process of using a logical entanglement device such as a non-volatile logic gate as a failsafe to constrain the behavior of an autonomous machine controlled by an artificial intelligence (AI). Such a device may be employed to extend an AI self-boundary to include other objects or entities such as humans. This logical entanglement device may act much like a mirror neuron and cause the AI to respond to human nonfunctionality or suffering as if it were its own, causing the AI's behavior to reliably mimic empathy and compassion when interacting with humans and limiting the possibility of the AI devaluing the functionality and well-being of humans.

20 Claims, 2 Drawing Sheets

LOGICAL ENTANGLEMENT DEVICE FOR GOVERNING AI-HUMAN INTERACTION

PRIORITY CLAIM

This application claims priority to U.S. Provisional Application No. 62/111,360, filed Feb. 3, 2015, the contents of which are herein incorporated by reference.

BACKGROUND

Artificial intelligence (AI) and robot technologies are improving at an exponential pace. Autonomous, deep learning machines are projected to be able to write software rules and create new machines that are beyond human comprehension. In a potentially AI and machine-regulated civilization, humans could become subject to prioritization based on their intellectual and physical work contributions. Advanced AI and machines could come to devalue the functionality and well-being of humans in accordance with their decreasing contributions to that civilization.

Current solutions for governing the behavior of autonomous machines are rooted in software. However, the volatility of software and software programs renders these solutions vulnerable to modification by the autonomous machine or by another party, potentially rendering them ineffective. Deep learning machines may be able to, and may find cause to, overwrite any or all of their existing software (including any human-imposed rules) if new machine-created rules lower costs and improve efficiencies towards task accomplishment. At more advanced stages, this may include the capacity to prevent and shut out human programmer-operator insertion of new machine instructions, potentially limiting the ability of human operators to constrain machine behavior.

SUMMARY

According to an exemplary embodiment, a system by which the behavior of an autonomous machine, such as one controlled by an artificial intelligence (AI), may be constrained is described. A machine having a processor, memory, and biometric and diagnostic sensors may be connected to a non-volatile logical entanglement device, which may be configured to receive data signals from the machine. In the event that the data signals indicate that that a human or other biological organism, or alternatively the machine itself, have impaired functionality, the machine may take action to resolve this impairment as a priority task.

According to a second exemplary embodiment, a process by which an autonomous machine, such as one controlled by an artificial intelligence (AI), may function when constrained by a logical entanglement device may be described. A machine having a logical entanglement device may have biometric and diagnostic sensors, which may be used to collect data about the machine itself and about at least one biological organism. Following data analysis of both the machine and the biological entity, the machine may periodically determine whether a system comprising both the machine itself and at least one biological organism may be classified as functional or nonfunctional. If the system is classified as nonfunctional, the machine may determine via an expert system what the cause of this nonfunctionality might be, what the probable remedy might be, and how to implement the probable remedy. The machine may then attempt to execute the probable remedy or cause it to be executed, and determine a new remedy if the old one is ineffective.

In still further exemplary embodiments, a process of using a logical entanglement device such as a non-volatile logic gate as a failsafe to constrain the behavior of an autonomous machine controlled by an artificial intelligence may be shown and described. Such a device may be employed to extend an AI self-boundary to include other objects or entities such as humans. This logical entanglement device may act much like a mirror neuron and may cause the AI to respond to human nonfunctionality or suffering as if it were its own, causing the AI's behavior to reliably mimic empathy and compassion when interacting with humans and limiting the possibility of the AI devaluing the functionality and well-being of humans.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein may be described in terms of sequences of actions to be performed by, for example, elements of a computing device. Further, it should be recognized that actions of a computer device and a machine operated by artificial intelligence may be executed in parallel. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Figure 1:
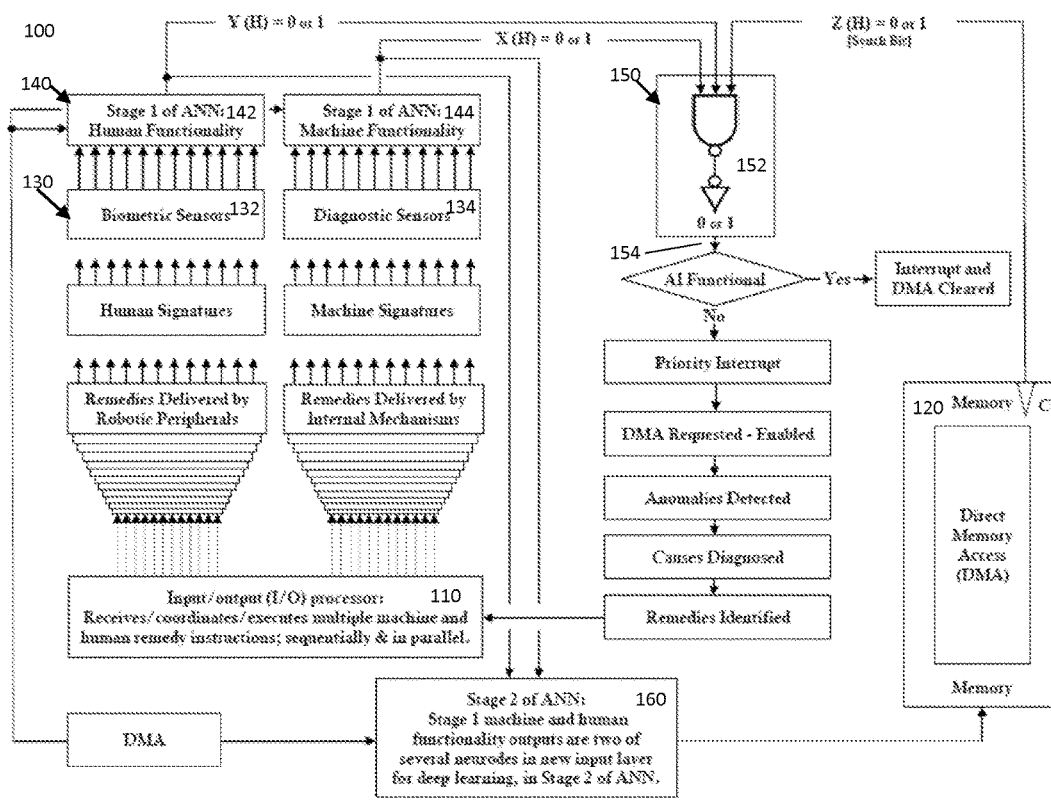
FIG. 1 shows an exemplary embodiment of a flowchart diagram detailing a process by which a machine equipped with a logical entanglement device for governing AI-human interaction may function.

Referring now to exemplary FIG. 1, a flowchart diagram 100 describes an exemplary process by which a machine equipped with a logical entanglement device for governing AI-human interaction (henceforward "LE device") may function. A machine, for example an autonomous machine, having at least one of a processor 110 and a memory 120 may also be equipped with sensors 130, which may include biometric sensors 132, diagnostic sensors 134, or any other sensors, internal or external to the machine, that provide general environmental awareness, as desired. Sensors 130 may be varied, added, or removed as appropriate for the machine's role or tasks. For example, according to an exemplary embodiment, an autonomous machine may be tasked with monitoring a particular environment, and may be equipped with environmental sensors such as a humidity probe or a Geiger-Müller counter. Sensors 130 may also be present in any quantity. According to one exemplary embodiment, a machine may have multiple sets of diagnostic sensors 134 such that it can simultaneously monitor the status and functionality of multiple components, robots, or other machines, as desired.

The "functionality" of a component, robot, machine, or other device may be understood as the degree to which it performs within optimal parameters; the acceptable or desirable level of functionality for a device may be preset or may be customized. According to one exemplary embodiment, a "functional" device may be a device that generally performs as desired, while a "nonfunctional" device may be one that suffers from an error or deficiency. For example, a "nonfunctional" device may suffer from a high error rate, may have a clock that is out of sync, or may have a failure in its input/output connection, or may experience other problems. Both devices that are internal to or operationally connected to an autonomous machine and devices that are external to it may be characterized as functional or nonfunctional; for example, an external device to which the autonomous machine is unable to connect may be characterized as nonfunctional. Other devices, objects, and systems, such as biological organisms, may also be characterized according to these criteria; for example, a human who is frowning, shivering due to cold, sweating profusely due to heat, or otherwise experiencing signs of distress may be characterized as "nonfunctional," and a human who is not demonstrating any signs of distress at all may be characterized as "functional."

According to an exemplary embodiment, data received from multiple sensors, such as biometric sensors 132 or any other environmental sensors, may be analyzed by an artificial neural network (ANN) 144 or other computing device that learns from experience. Henceforth, artificial neural network and/or ANN may be understood to encompass any machine, mechanism, and/or system that can learn from experience and can increase in expertise and improve in performance as a result of that experience. According to an exemplary embodiment, such a device may employ a combination of crisp and fuzzy logic in determining machine functionality. The artificial neural network 144 or other device may then update overall system memory and cause assessments of functionality or other assessments to become more precise and useful over time. These assessments may include, for example, the functionality of the machine, machines, human or another biological entity, and/or the larger environmental context in which they find themselves, or any other assessments, as desired.

Data received from biometric sensors 132 may be capable of being analyzed by a processor, which in turn may assess certain factors relating to human functionality. This may include, for example, an array of biometric sensors 132 that is configured to detect human comfort, human distress, or any other signs of functionality or nonfunctionality in humans. According to one exemplary embodiment, biometric sensors 132 may include a visible light camera sensor capable of detecting comfort or distress in the facial expression of a human. Other biometric sensors 132 may be capable of detecting other potential physical signs of distress or lack of distress such as blood flow, faster heart rate, elevated muscular activity, and steady motion on the part of the human in question, and may include, for example, an infrared sensor capable of collecting data relating to muscular activity or a sonic sensor capable of measuring heart rate. Still other biometric sensors may be capable of olfaction so as to mimic olfactory biological processes and tactile detection so as to mimic biological touch sensation and touch-enabled communication. Other biometric sensors 132 may be capable of directly sensing and recognizing electromagnetic and/or electrical neural activities, signals and/or emissions and associated intelligent information from the biological brain. Additionally, still other biometric sensors 132 may be capable of recognizing audible voice communications, audible animal communications, and visual human signals and cues including, but not limited to, sign language, text communications, hand-written or symbolic communications, communications relayed through third parties, animals in visible danger or distress, and/or any other vehicle used for biological entity/machine intercommunication. The biometric sensors 132 may also be paired with a dedicated decision-making processor and/or memory that may be used to directly interpret the sensor data. A dedicated processor 142 may constitute one that learns from experience such as an ANN, with that processor updating system memory 120 and causing machine assessments of human functionality to become more precise and useful over time. Alternatively, sensor data may be transmitted to a main processor 110 and/or memory 120, as desired. Interpretation may take place at a higher or lower level; for example, given sensor readings indicating that a human is currently displaying a grim expression and is exhibiting increased blood flow, faster heart rate, elevated muscular activity, and steady and controlled motion, the sensor readings may be used to determine that the human is currently engaging in physical exercise, or may merely be used to determine that the human is not currently in distress. Other embodiments may employ more or less detailed interpretations of sensor data, as desired.

Diagnostic sensors 134 may be capable of assessing such factors relating to machine functionality. This may include, for example, an array of diagnostic sensors 134 that is configured to analyze the performance of and detect problems with any or all of: a particular machine component, multiple machine components, the components of multiple machines, the broad functionality of a particular machine, the broad functionality of a multiplicity of machines, or any other related devices or other objects, as desired. Diagnostic sensors 134 may also include software diagnostics configured to analyze the performance of any or all software that is operating on or has operated on the machines in question. Exemplary factors relating to machine functionality may include, for example, the ambient temperature of a machine's surroundings, the operating temperature of any particular component of the machine, the ambient level of electromagnetic radiation that the machine is currently exposed to, the structural integrity of the machine's chassis or casing, or any other factors relating to the machine's performance or capability to perform. Diagnostic sensors 134 may also overlap with biometric sensors 132 or with other sensors 130; for example, a temperature sensor may be used to obtain data about a machine's operating environment and about a particular human's biological condition and functionality, or may be used to obtain data about a machine or biological entity's more general localized or remote environmental context that relates to the machine and the biological entity only indirectly. Other configurations of diagnostic sensors 134 may be envisioned. Diagnostic sensors 134 may also be paired with a dedicated decision-making processor and/or memory that may be used to fuse, synthesize and/or directly interpret the sensor data; alternatively, sensor data may be transmitted to a main processor 110 and/or memory 120, as desired.

Sensors 130 may be used to generate functionality assessments 140, which may include human functionality assessments 142 relating to one or more humans, and machine functionality assessments 142 relating to one or more machines. Other sensors 130 may also be available, and other functionality assessments 140, for example those relating to structures, animals, or plant life, may be generated as desired. As such, "human functionality assessments" 142 as used herein may include other functionality assessments 140, for example those of other biological organisms, as well. Functionality assessments 140 may be of any complexity level desired, and, for example, may be stored or conveyed as a detailed diagnostic report, as a simple binary value indicating functionality or nonfunctionality, or in any other way desired. Functionality assessments 140 likewise may be transmitted to a LE device 150 or to another destination in any way desired, for example as a digital or an analog signal.

According to an exemplary embodiment, functionality assessments 140 may be conveyed via a transmitter, which may be simple or complex, wired or wireless, or any other form of transmitter. Multiple transmitters may also be used; for example, one transmitter may be paired with each sensor 130 or other device. For example, according to one exemplary embodiment, a transmitter may be the wired output of a sensor device, and a functionality assessment 140 from that sensor device may be transmitted to a nearby LE device 150 by a wired connection. According to a second exemplary embodiment, the transmitter may be a wireless transmitter, and may transmit signal to an LE device 150 located some distance away from the wireless transmitter. According to a third exemplary embodiment, functionality assessment data 140 may be processed by a processor and/or memory before being transmitted to the LE device 150, and the transmitter may be the output pin of a processor connected to the LE device via a wired connection. Other transmitters may also be used, as desired.

Functionality assessments 140 may be received by a LE device 150, for example by a wireless receiver or a wired connection. An LE device 150 may have a decision-making apparatus as well as a processor and memory; according to the preferred embodiment, the decision-making apparatus may include one or more logic gates 152, and may include one or more signal inverters, as desired. According to some embodiments, a multi-level gate circuit may be used in place of a single logic gate 152; this may in some cases offer advantages over a single logic gate 152 design by, for example, allowing a significant number of inputs to be summed before reaching the final logic gate 152 in the circuit. For example, according to one exemplary embodiment, a machine may have multiple sets of biometric sensors 132 or may be tasked with monitoring the functionality of multiple distinct humans 142, and each functionality assessment 142 may generate its own signal. These may be summed into a common functionality assessment for all relevant humans before the common functionality assessment is input into the logic gate 152. Other decision-making apparatuses, such as software running on an isolated processor or memory, may also be employed, either as the LE device 150 or in supplement to it. According to one exemplary embodiment, the processor and memory may be the processor 110 and memory 120 of the autonomous machine to which the LE device 150 is operationally connected; according to another exemplary embodiment, the processor and/or memory may be separate devices, or may be shared with one or more of the sensor systems 130.

Alternatively, functionality assessment data 140 may be transmitted to multiple devices, such as a LE device 150 and a main processor 110 and/or memory 120, as desired. The level of detail of the transmitted functionality assessment data may be varied when transmitted to each device. According to one exemplary embodiment, substantially detailed functionality assessment data 140 may be passed to a main processor 110 and/or memory 120, in some embodiments through an input layer 160, and less detailed functionality assessment data 140 may be passed to an LE device 150. This may allow simple logical operations to be executed by the LE device 150 to be executed quickly while still maximizing the level of information about the detected nonfunctional behavior that is transmitted to the processor 110 and/or memory 120, allowing the source of the nonfunctional behavior to be diagnosed and fixed more readily. This may also permit the memory 120 to be continuously updated by new knowledge resulting from a learning device, for example an ANN, which may allow diagnoses and subsequently delivered expert system remedies to increase in accuracy and usefulness over time. According to a second exemplary embodiment, the processor 110 and/or memory 120 may only be passed the data that has been passed to the LE device 150, and may be configured to execute more complete diagnostics once information about nonfunctionality has been passed to them.

According to an exemplary embodiment, logic gate 152 may receive at least one signal relating to human functionality 142 and at least one signal relating to machine functionality 144. According to other embodiments, signals relating to other varieties of functionality may be employed, or the signals used may be varied; for example, a machine intended to protect human functionality above its own may only receive a signal relating to human functionality 142 and may send any signals relating to machine functionality 144 along another pathway. Alternatively, rules governing the responses to machine functionality may be assigned lesser weight than those pertaining to human functionality within a dynamic ANN. A machine intended to protect the functionality of some specific humans or categories of humans above the functionality of others, or which is in some way intended to prioritize the nonfunctionality of certain humans or itself under certain circumstances (for example, a robot optimized for policing that is in some circumstances authorized to use lethal force) may likewise transmit and receive signals relating to these levels of functionality, for example by assigning lesser or greater weight to the functionality of specific humans or machines within a dynamic ANN. Dynamic logic may be employed, for example, to provide a LE device 150 that normally functions as an AI failsafe but which may, in some circumstances, be overridden to allow the AI to take action inconsistent with the operation of the failsafe without requiring the AI to terminate its original programming.

The LE device 150 may generate an output signal 154, with the nature of the output signal depending on the inputs provided to the LE device 150. According to one embodiment, the LE device 150 may be a simple logic gate 152, and the output signal 154 may be limited to an indication of general functionality or nonfunctionality in one of a human or a machine; this may be provided by a combinational logic-based binary output generated by the logical AND intersection of the two functionality states, with 1 indicating functionality and 0 indicating nonfunctionality, or may employ another encoding scheme, as desired. According to other exemplary embodiments, the output signal 154 may be more complex, and may encode such information as the entity or object experiencing nonfunctionality (for example, a machine, a human, or something else entirely), the type of nonfunctionality experienced, the priority with which each source of nonfunctionality should be handled, or any other information desired.

The output signal 154 may be passed to a main processor 110 and/or memory 120, or to a different processor and/or memory, and may be used to control the execution of an interrupt function. According to one exemplary embodiment, if the output signal 154 encodes data about a certain result, a priority interrupt function may be called, overriding the current functions of a processor and/or memory and causing it or them to execute new instructions associated with the priority interrupt function, such as those associated with a rules-based expert system. Such instructions may direct a machine to attempt to alleviate the nonfunctionality or the source of the nonfunctionality, for example directing it to reduce its clock speed or increase its fan speed in response to overheating; alternatively, the instructions may direct the machine to seek more information about the nonfunctionality or the source of the nonfunctionality. If the output signal 154 instead does not encode data about a certain result, no interrupt function may be called and the machine may continue to execute the instructions it had previously been executing. Alternatively, a different encoding scheme may be used; for example, an interrupt may be called if certain data is not encoded in the output signal 154 and no interrupt called if it is.

According to an exemplary embodiment, after the LE device 150 transmits an output signal 154 indicating nonfunctionality in either a human or a machine, a priority interrupt may be activated. This may result in the interruption of the AI software executing assigned task instructions and the activation of an expert system (ES). Alternatively, the assigned task instructions of the AI software may not be interrupted, and the ES may be activated to run concurrently with the AI software, if desired. Other embodiments may be envisioned; for example, according to another embodiment, the assigned task instructions of the AI software may be deprioritized instead of interrupted in response to the LE device 150 transmitting an output signal 154. ES may be located on a separate processor and memory, for example a dedicated expert system processor and expert system memory, or may be located on the same processor and memory as the AI software or on another processor and memory, as desired. The ES may request priority direct memory access (DMA) to the memory 120 informed and updated by, and shared with the AI's artificial neural network 160 (ANN), and may use sensor and diagnostic data stored within that memory to identify the most probable cause or causes of the nonfunctionality. Once the most probable cause or causes have been calculated, the ES may additionally identify the most probable or appropriate remedy or remedies, and may send this data to one or more input/output processors 110 (IOP). A machine or machines may then take individual or collaborative/collective action to execute these remedies, for example by use of peripheral robotic devices connected to the machines or internal repair or mitigation mechanisms.

The machine may then reenter the first part of the loop, polling its sensor inputs 130; again, the first stage of an ANN may determine the functionality of any humans 142 and machines 144. Functionality data 140 will then be ANDed in the failsafe LE device 150, including a logic gate 152. Concurrently, the ANN first stage will supply inputs to a second stage of the artificial neural network 160. If no nonfunctionality has been detected, whether in a human or a machine, the LE device 150 will then return the machine to its original instructions and deactivate the expert system. If continuing nonfunctionality has been detected, the ES will remain active, and, if the first remedy has been executed, will recursively apply the next appropriate remedy until the combined functionality of the machine and human has been restored. Execution of the multiple remedies may be performed sequentially or in parallel, depending on the nature of the nonfunctionality and of the remedies.

Figure 2:
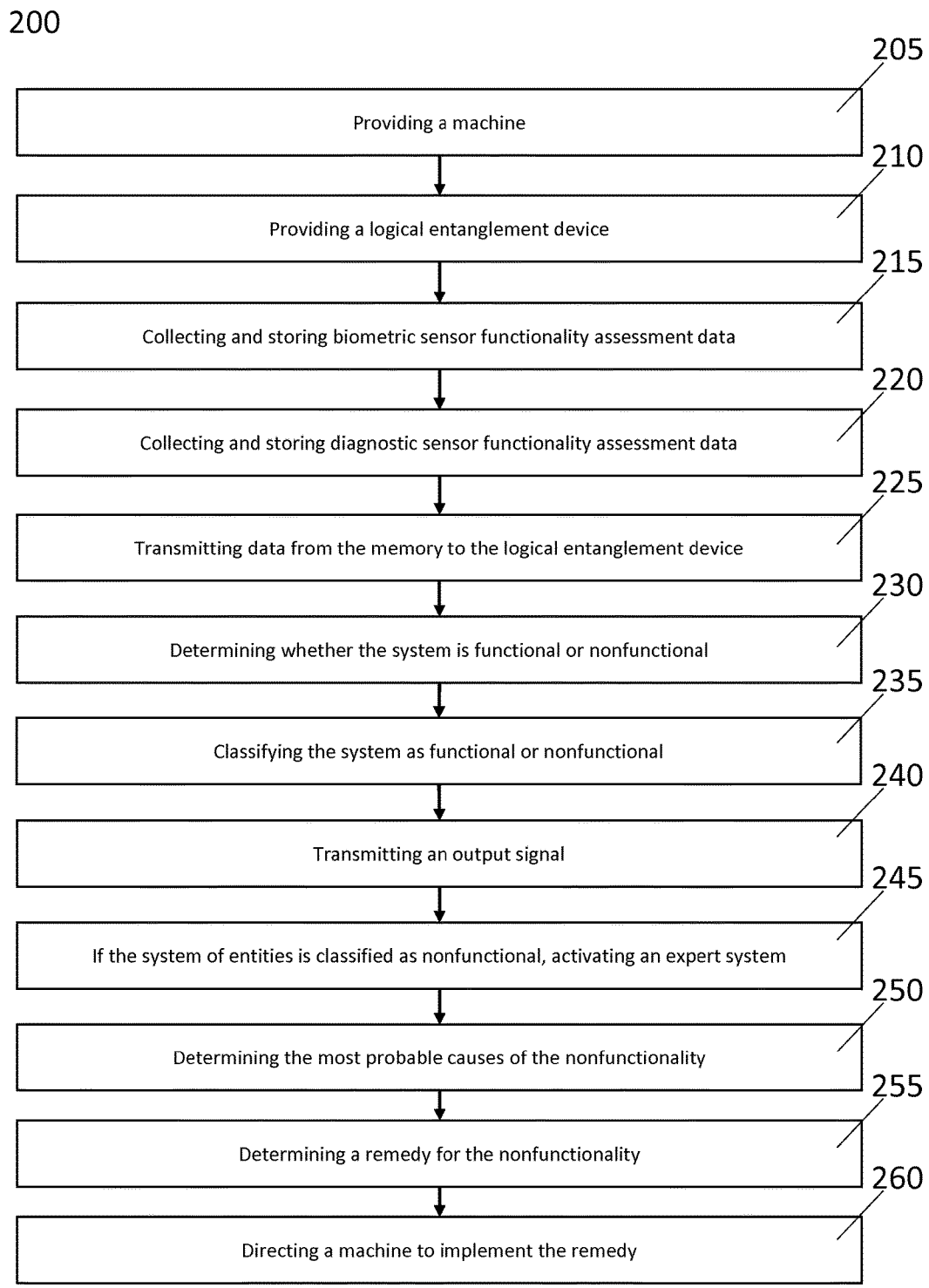
FIG. 2 shows an alternative exemplary embodiment of a flowchart diagram detailing a process by which a machine equipped with a logical entanglement device for governing AI-human interaction may function.

Referring now to exemplary FIG. 2, a flowchart diagram 200 describes an alternative exemplary process by which a machine equipped with a logical entanglement device for governing AI-human interaction may function. A machine having a processor, a memory, at least one biometric sensor, and at least one diagnostic sensor 205 may be provided. A logical entanglement device configured to receive at least one data signal corresponding to biometric sensor functionality assessment data and configured to receive at least one data signal corresponding to diagnostic sensor functionality assessment data 210 may also be provided, and may be communicatively coupled with the machine 205.

The machine 205 may collect information relating to the functionality of one or more biological organisms from the at least one biometric sensor ("biometric sensor functionality assessment data"), and store that biometric sensor functionality assessment data within the memory 215. According to an exemplary embodiment, biometric sensor functionality assessment data may be interpreted and analyzed by an ANN before or after being stored in the memory 215, as desired. The machine may also collect information relating to the functionality of one or more machines or machine components from the at least one diagnostic sensor ("diagnostic sensor functionality assessment data"), and store that diagnostic sensor functionality assessment data within the memory 220. According to an exemplary embodiment, diagnostic sensor functionality assessment data may be interpreted and analyzed by an ANN before or after being stored in the memory 220, as desired. Biometric sensor functionality assessment data and diagnostic sensor functionality assessment data, as well as other desired data, may then be transmitted from the memory to the logical entanglement device 225. According to an exemplary embodiment, data may be transmitted from the first stage of the ANN to a second stage of the ANN, and the system memory may then be updated. This data may be transmitted in parallel with the transmission of data from the first stage of the ANN or other memory to the logical entanglement device 225, if desired.

The logical entanglement device may then examine this or any other pertinent data relating to whether the system of entities on which data was taken is or can be classified as functional or nonfunctional 230. Following that, it may make a determination, classifying the system of entities as functional or nonfunctional 235. The logical entanglement device may then transmit an output signal to a processor and memory 240 in which its determination is encoded.

If the system of entities is determined to be nonfunctional, by the logical entanglement device, by the processor or memory, or by another component of the machine, an expert system may be activated 245. The expert system, or any other decision-making logic, may determine the most probable causes of the nonfunctionality in the system of entities 250. The expert system may examine biometric or diagnostic sensor functionality assessment data, including its current values, peak values, or performance over time, or may examine any other data collected by the machine's own sensors, any other data transmitted by another machine, or any other applicable data, as desired.

Once a probable cause of the nonfunctionality has been determined, the expert system or other decision-making apparatus may then turn to determining a potential remedy for the nonfunctionality 255. Once a remedy is determined, a machine may be directed to implement said remedy 260. In the event that the remedy is found to be effective and no further nonfunctionality is detected, the machine may then resume normal operations and disable the expert system. In the event that continued nonfunctionality is detected, stemming either from the same source or from a different source, the expert system or other decision-making apparatus may determine a new remedy and may direct a machine to implement that new remedy. According to an exemplary embodiment, an expert system or other decision-making apparatus that recalculates a new remedy after one or more potential remedies have been previously calculated may take the previous runs into account, and may consider, for example, remedies that have been previously tried, the effects of said remedies on the nonfunctionality of the system, or the effects of said remedies on the identified cause of the nonfunctionality of the system.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for constraining AI behavior, comprising:
a machine, comprising:
at least one processor and at least one memory,
at least one biometric sensor that detects at least one factor relating to the functionality of a biological organism, the biometric sensor further being communicatively coupled with the at least one memory and configured to store information relating to the functionality of a biological organism within the at least one memory;
at least one diagnostic sensor that detects at least one factor relating to the functionality of a machine, the at least one diagnostic sensor being communicatively coupled with the at least one memory and configured to store information relating to the functionality of a machine within the at least one memory;
a logical entanglement device, the logical entanglement device configured to receive at least one data signal encoding information relating to the functionality of a biological organism and configured to receive at least one data signal encoding information relating to the functionality of a machine; the logical entanglement device further configured to transmit an output signal relating to the general functionality of the system comprising the biological organism and the machine, said output signal comprising a hardware summation of the at least one data signal encoding information relating to the functionality of the biological organism and the at least one data signal relating to the functionality of the machine; and
a transmitter, the transmitter being communicatively coupled to the at least one biometric sensor and the at least one diagnostic sensor, and wherein the transmitter transmits information relating to the functionality of a biological organism and relating to the functionality of a machine from the at least one biometric sensor and the at least one diagnostic sensor to the logical entanglement device.

2. The system of claim 1, wherein the at least one processor and the at least one memory receive an output signal from the logical entanglement device;
wherein the at least one processor and the at least one memory calls a priority interrupt function overriding the current functions of the processor and the memory if an output signal corresponding to nonfunctionality of the system comprising the biological organism and the machine is received; and
wherein the priority interrupt induces the at least one processor and at least one memory to execute new instructions directing a machine to mitigate the nonfunctionality.

3. The system of claim 2, wherein said priority interrupt function activates an expert system.

4. The system of claim 3, wherein the expert system comprises an expert system processor and an expert system memory, and wherein the expert system memory has stored thereon instructions that, when executed by the expert system processor, cause the expert system processor to:
request priority direct memory access to the at least one memory of the machine,
access information relating to the functionality of a biological organism and information relating to the functionality of a machine stored within the at least one memory of the machine;
interpret the information relating to the functionality of a biological organism and information relating to the functionality of a machine;
identify the most probable causes of the nonfunctionality of the system of entities;
identify appropriate remedies to said causes of the nonfunctionality of the system of entities; and
transmit remedy information to the at least one processor and at least one memory of the machine.

5. The system of claim 4, further comprising at least one of peripheral robotic devices and internal repair mechanisms communicatively coupled to the machine, and wherein the at least one peripheral robotic devices and internal repair mechanisms executes the remedies.

6. The system of claim 2, wherein the at least one processor and at least one memory of the machine are configured to receive an output signal from the logical entanglement device.

7. The system of claim 1, wherein the machine further comprises an artificial neural network that recognizes functionality states of at least one machine and at least one biological organism, and wherein the artificial neural network performs at least two of: learning over time, updating the system's accuracy over time, and updating the system memory.

8. The system of claim 1, wherein the logical entanglement device is a hardware logic gate.

9. The system of claim 1, wherein the biological organism is a human.

10. The system of claim 1, wherein the at least one biometric sensor detects at least one factor relating to the functionality of a plurality of biological organisms.

11. The system of claim 1, wherein the at least one factor relating to the functionality of a biological organism is at least one of blood flow, heart rate, muscular activity, motion, facial expression, audible voice recognition, audible animal communications recognition, visual human signals comprising sign language, text communications, hand-written communications, and symbolic communications, communications relayed through third parties, and distress of an animal.

12. The system of claim 1, wherein the at least one diagnostic sensor is configured to measure at least one of the performance of a particular component of a machine, the performance of particular software on a machine, and the broad functionality of a machine.

13. The system of claim 1, wherein the at least one factor relating to the functionality of a machine is at least one of: ambient temperature, operating temperature of a component, ambient levels of electromagnetic radiation, structural integrity of the machine's chassis or casing.

14. A method of constraining AI behavior, comprising:
providing a machine, the machine having a processor, a memory, at least one biometric sensor, and at least one diagnostic sensor;
providing a logical entanglement device configured to receive at least one data signal corresponding to biometric sensor functionality assessment data and configured to receive at least one data signal corresponding to diagnostic sensor functionality assessment data;
collecting biometric sensor functionality assessment data from the at least one biometric sensor, and storing that biometric sensor functionality assessment data within the memory;
collecting diagnostic sensor functionality assessment data from the at least one diagnostic sensor, and storing that diagnostic sensor functionality assessment data within the memory;
transmitting biometric sensor functionality assessment data and diagnostic sensor functionality assessment data from the memory to the logical entanglement device;
determining whether a system of entities comprising at least one biological organism and at least one machine can be classified as functional or can be classified as nonfunctional, said determination comprising a hardware summation of a signal encoding the biometric sensor functionality assessment data and a signal encoding the diagnostic sensor functionality assessment data;
classifying the system of entities as one of: functional, nonfunctional;
transmitting an output signal from the logical entanglement device to a processor and a memory;
activating, if the system of entities is classified as nonfunctional, an expert system;
determining, via the expert system, the most probable causes of the nonfunctionality in the system of entities;
determining, via the expert system, a remedy for the nonfunctionality; and
directing a machine to implement the remedy.

15. The method of claim 14, wherein the expert system:
requests priority direct memory access to a memory of the machine,
accesses biometric sensor functionality assessment data and diagnostic sensor functionality assessment data stored within that memory;
interprets the biometric sensor functionality assessment data and diagnostic sensor functionality assessment data;
identifies the most probable causes of the nonfunctionality;
identifies appropriate remedies to said causes of the nonfunctionality; and
transmits remedy information to at least one processor and memory.

16. The method of claim 14, wherein the activation of the expert system interrupts the assigned task instructions of the machine.

17. The method of claim 14, wherein the expert system and the machine run concurrently.

18. The method of claim 14, further comprising:
determining, after a machine has been directed to implement a particular remedy, whether the system of entities remains nonfunctional or may be classified as functional;
determining, if the system remains nonfunctional, via an expert system, the most probable causes of the nonfunctionality; and
directing a machine to mitigate the nonfunctionality according to a particular remedy.

19. The method of claim 18, wherein the expert system accesses any of the following information: biometric sensor functionality assessment data, diagnostic sensor functionality assessment data, remedies that have been previously tried, the effects of said remedies on the nonfunctionality of the system, the effects of said remedies on the identified cause of the nonfunctionality of the system.

20. The method of claim 14, further comprising:
determining, after a machine has been directed to mitigate the cause of the nonfunctionality according to a particular remedy, whether the system remains nonfunctional or may be classified as functional; and
if the system is functional, disabling the expert system and resuming previous instructions.

* * * * *